United States Patent
Bostick et al.

(10) Patent No.: US 9,728,229 B2
(45) Date of Patent: Aug. 8, 2017

(54) SEARCHING VIDEO CONTENT TO FIT A SCRIPT

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/864,811

(22) Filed: Sep. 24, 2015

(65) Prior Publication Data

US 2017/0092332 A1 Mar. 30, 2017

(51) Int. Cl.
| | |
|---|---|
| H04N 9/80 | (2006.01) |
| H04N 5/92 | (2006.01) |
| G11B 27/00 | (2006.01) |
| H04N 5/93 | (2006.01) |
| G11B 27/22 | (2006.01) |
| G11B 27/031 | (2006.01) |
| G10L 25/57 | (2013.01) |
| G10L 15/26 | (2006.01) |
| G06F 7/00 | (2006.01) |
| G06F 17/30 | (2006.01) |

(52) U.S. Cl.
CPC .............. *G11B 27/22* (2013.01); *G10L 15/26* (2013.01); *G10L 25/57* (2013.01); *G11B 27/002* (2013.01); *G11B 27/031* (2013.01)

(58) Field of Classification Search
CPC .. G06F 7/00; G06F 17/30; H04N 9/80; H04N 5/92; H04N 5/93; G11B 27/00
USPC ........ 386/241, 239, 248, 278, 280; 707/708, 707/771, 713, 726
See application file for complete search history.

(56) References Cited

U.S. PATENT DOCUMENTS

| | | | | |
|---|---|---|---|---|
| 6,182,069 B1 * | 1/2001 | Niblack | .............. | G06F 17/3025 |
| 6,195,497 B1 * | 2/2001 | Nagasaka | ........... | G06F 17/3079 |
| | | | | 345/418 |
| 7,143,434 B1 * | 11/2006 | Paek | ................. | G06F 17/30858 |
| | | | | 345/619 |

(Continued)

OTHER PUBLICATIONS

Anonymous; Comparative Information Based Video and Image Object Search, Mar. 16, 2015.

*Primary Examiner* — Daquan Zhao
(74) *Attorney, Agent, or Firm* — Garg Law Firm, PLLC; Rakesh Garg; Christopher K. McLar (57) ABSTRACT

For video searching, a set of objects and a relationship between objects in the set of objects is determined in a portion of a script for creating a video. From a collection of video clips, a set of video clips is selected based on matching an object from the set of objects to an object specified in a metadata of a video clip that is selected in the set of video clips. A duration of the relationship in the portion is computed. video analysis is performed on the video clip to determine whether the video clip includes the relationship. When the video clip includes the relationship, a determination is made whether the relationship in the video clip is at least of the duration. When the relationship is at least of the duration, the video clip is selected as a fit for the portion of the script.

20 Claims, 6 Drawing Sheets

(56) References Cited

U.S. PATENT DOCUMENTS

| | | | |
|---|---|---|---|
| 7,813,557 B1* | 10/2010 | Bourdev | G06F 17/30268 |
| | | | 382/205 |
| 8,037,051 B2* | 10/2011 | Franks | G06F 17/30817 |
| | | | 707/708 |
| 8,370,869 B2 | 2/2013 | Paek et al. | |
| 8,433,698 B2 | 4/2013 | Franks et al. | |
| 8,719,884 B2* | 5/2014 | Sharon | H04H 60/59 |
| | | | 725/115 |
| 8,768,048 B1* | 7/2014 | Kwatra | G06K 9/72 |
| | | | 382/159 |
| 2013/0166303 A1 | 6/2013 | Chang et al. | |
| 2014/0201180 A1 | 7/2014 | Fatourechi et al. | |
| 2014/0205158 A1* | 7/2014 | Fukazawa | G06K 9/00288 |
| | | | 382/118 |
| 2014/0376874 A1* | 12/2014 | Aman | A63B 24/0021 |
| | | | 386/223 |
| 2015/0032718 A1* | 1/2015 | Hlin | G06F 17/30061 |
| | | | 707/710 |

* cited by examiner

SEARCHING VIDEO CONTENT TO FIT A SCRIPT

TECHNICAL FIELD

The present invention relates generally to a method, system, and computer program product for searching video content. More particularly, the present invention relates to a method, system, and computer program product for searching video content to fit a script.

BACKGROUND

Video production proceeds according to a script. Normally, video production includes shooting some video footage, editing the shot footage, and splicing stock video clips with the edited footage as necessary to prepare the final video product.

Generally, the production of video content involves assembling video from multiple sources. Consider, for example, producing a documentary about a ski resort. The documentary team may have captured some footage at the ski resort location. During post production, as the video is edited, it becomes evident that the script of the video requires footage beyond what was captured during the initial on-location shoot.

Supplemental video content, often from stock video, that is added into a video production is known as B-roll footage. Typically, the editing personnel view a collection of supplemental video clips and select those supplemental video clips that they deem suitable according to the script.

In some cases, metadata of a video clip provides some information about the lead actors or significant characters in the video clip, date of publication, a summary of the story of the video clip, licensing and ownership information, and other such information. When available, such metadata is useful in shortlisting some supplemental video clips from a sizeable collection of supplemental video content. The editing staff must then view each shortlisted video clip and select some, all, or none of the shortlisted video clip for use in the video according to the script.

In some cases, some videos are created entirely from stock footage. In such cases as well, during production, the editing staff has to view, select, and assemble that supplemental video clip which relates to the script for the video.

SUMMARY

The illustrative embodiments provide a method, system, and computer program product for searching video content to fit a script. An embodiment includes a method for video searching. The embodiment determines, in a portion of a script for creating a video, a set of objects and a relationship between objects in the set of objects. The embodiment selects, from a collection of video clips, a set of video clips, the selecting being based on matching an object from the set of objects to an object specified in a metadata of a video clip that is selected in the set of video clips. The embodiment computes a duration of the relationship in the portion. The embodiment performs video analysis on the video clip to determine whether the video clip includes the relationship. The embodiment determines, responsive to the video clip including the relationship, whether the relationship in the video clip is at least of the duration. The embodiment selects, responsive to the relationship being at least of the duration, the video clip as a fit for the portion of the script.

An embodiment includes another computer program product for video searching, the computer program product comprising one or more computer-readable storage devices, and program instructions stored on at least one of the one or more storage devices.

An embodiment includes another computer system for video searching, the computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that presently, video search tools rely on the metadata associated with video clip. The metadata of a given video clip can take the form of one or more keywords, title, description, tags, categories, production information, view count, ratings, and the like. In some cases, a given video clip may have no metadata at all, making finding the video clip and obtaining information about the video clip a very time-consuming task.

Persons, actors, characters, places, or things are collectively referred to hereinafter as "object" or "objects". In some cases, the keywords or another form of metadata of a video clip provides information about some objects appearing in the video clip. The illustrative embodiments recognize that while keyword search or metadata search is a useful method for finding the objects contained within a video clip, such a method suffers from several drawbacks.

For example, such a method of searching a collection of video clip requires that metadata describing the objects be available for a video clip. As another example, unless such metadata is exhaustive, the search based on partial metadata is not definitive because not all objects present in the video clip are present in the metadata describing the contents of the video clip.

The illustrative embodiments further recognize that many other factors determine the suitability of a video clip for use in a video production according to a script. As one example factor, the script may require not only that a particular object be present in a given video clip but also that the object have a certain relationship with another object in the video clip. For example, in a script for producing a video about a ski resort, the script may require not only the presence of a ski lift (an object) in a candidate video clip, but also that people (another object or objects) be shown skiing under the ski lift (a relationship). In other words, the script requires that the ski lift object and the skiers objects bet related by having the skiers ski under the ski lift.

Assume, as an example, that a candidate video clip has metadata, which suggests that the video clip portrays a ski lift, and skiing. Given the above example factor of a relationship between objects, the metadata is insufficient to conclude whether the skiing activity in the candidate video clip is occurring under the ski lift. Thus, the metadata is not useful in selecting the video clip, and the editing staff will have to view the video clip to manually and visually determine whether the skiing activity occurs under the ski lift in the candidate video clip.

As another example factor, the script may require not only that the skiers be shown skiing under the ski lift, but that such depiction or portrayal in the candidate vide be of a certain duration. Again, consider the same example candidate video clip with the example metadata. Given the above example factor of a duration of a relationship, the metadata is insufficient to conclude whether the skiing activity in the candidate video clip is occurring under the ski lift for the specified length of time. Thus, the metadata is not useful in selecting the video clip, and the editing staff will have to view the video clip to manually and visually determine whether the skiing activity occurs under the ski lift in the candidate video clip for the length of time needed according to the script.

Generally, if a user is using a presently available method of video search for searching for video clips featuring a particular interaction of objects, the user may only receive a result set where the metadata matches some of the searched objects. The user then has to view the each candidate video clip returned by keyword search to find whether any candidate video clip shows the interaction of the objects for which the user performed the search.

Furthermore, the user has to know and specify the objects to a presently used video searching method, so that the method may search the metadata for those specified objects. The illustrative embodiments recognize that in many cases, the objects that are needed in a candidate video clip, even without requiring any particular interaction or duration of the interaction between them, is a non-trivial task. In a script of even a fifteen minute long video production, the objects can be hidden, referenced in a variety of ways, referenced indirectly, referenced using entities outside the script, and in many other forms.

A presently available method for searching video content cannot simply take the script or a script portion as an input and return one or more candidate video clips that have certain desired objects. A user has to read the script, understand the script, identify the objects, and specify those objects to the presently available video search methods, to even obtain a result set of candidate video clips to view through.

The illustrative embodiments used to describe the invention generally address and solve the above-described problems and other problems related to searching video content.

The illustrative embodiments provide a method, system, and computer program product for searching video content to fit a script.

An embodiment receives a script in which at least a portion has been identified for finding one or more video clips. The embodiment analyzes the script portion to form an object relationship diagram (ORD). Specifically, the embodiment uses a Natural Language Processing (NLP) engine to perform a deep parsing of the portion to extract a set of objects from the portion of the script. For example, a script may be a textual document, audio data, or even in video form. Given the script and any script related-data, the NLP engine identifies the objects that participate in the portion.

Furthermore, the NLP deep parsing reveals how the objects are related to one another in the portion. Given the set of objects and a set of relationships existing within the set of objects, the embodiment constructs an ORD.

An embodiment further determines a duration for which a relationship has to be effective according to the portion. For example, if a ski lift object has to be related to one or more skier objects by having the one or more skier objects relate to the ski lift object by skiing under the ski lift object, the embodiment determines a duration of the portrayal of such skiing activity under the ski lift.

As a non-limiting example, assume that the script is a text document. Further assume that the script has to be narrated by a narrator in the video that will be produced according to the script. Different narrators speak at different speeds. Therefore, different narrators will take different amounts of time to read the portion of the script.

An embodiment uses a speech profile of a narrator. The speech profile is sufficient to determine a speed of the narrator's speech. In one embodiment, the speech profile provides the speed as a numeric value, such as average number of words per minute.

In another embodiment, the speech profile provides one or more examples of speech patterns spoken by the narrator. The embodiment computes a numeric value of the speed by analyzing one or more speech patterns.

In another embodiment, the speech profile provides one or more examples of speech patterns spoken by the narrator in the same subject matter domain as the subject matter domain of the portion. This is useful because the same narrator can speak at different rates when talking about different topics or subject matter. For example, a person might talk slower than a threshold speed when narrating a scientific concept, but may speak at a faster rate when narrating a social conversation.

The embodiment extracts a subject matter of the portion of the script using the NLP deep parsing. The embodiment selects a speech pattern that is compatible or comparable to the subject matter of the portion. The embodiment measures a speed of the narrator's speech for that subject matter.

Using the computed speed, an embodiment computes an amount of time the narrator will take to read or narrate the portion of the script. The embodiment uses this amount of time as the duration for which the activity or the relationship of the objects has to be portrayed in a candidate video clip.

When the script portion is in audio or video form, the portion may already be narrated by some narrator. If the narrator is the actual narrator who will narrate the portion in the video, an embodiment measures an amount of time the actual narrator took to narrate the portion. The embodiment then uses the amount of time as the duration of the relationship.

If the narrator is someone other than the actual narrator, an embodiment can use a speech profile of the actual narrator as described herein. Alternatively, an embodiment can use the time taken by the current narrator to narrate the portion, and extrapolate using a rule to estimate an amount of time an actual narrator would take to narrate the same portion. The embodiment uses the estimated amount of time as the duration of the relationship.

An embodiment weights a relationship between two objects in the ORD. A weight of a relationship corresponds to the duration of the relationship. In one embodiment, the duration of a relationship is used as the weight of the relationship.

Now, the embodiment has a set of objects, a set of relationships, and a set of weights arranged in a weighted ORD. An embodiment uses the set of objects to select a set of candidate video clips. For example, the embodiment constructs a search query for an existing metadata-based video search engine, where a video clip in the result set must include at least a threshold number of objects, at least those objects that are identified as mandatory, or some combination thereof.

An embodiment supplies a candidate video clip from the result set of candidate video clips, one or more objects from the ORD, and one or more relationships from the ORD, to an existing image analysis tool for video analysis. For example, presently available image analysis tools can determine whether an image, such as a frame in a video, includes two objects in a relative position with one another. As an example, an image analysis tool can determine whether a cat (an object) is wearing (a relationship) a sweater (another object) in a given image. As another example, an image analysis tool can determine whether a skier (an object) is under (a relationship) a ski lift (another object) in a given image.

One embodiment further specifies to the image analysis tool the duration for which the relationship has to be present in the video clip. For example, suppose that a narrator takes 4 seconds to speak a sentence—an example portion of a script—involving a skier skiing under a ski lift. For a primary analysis, the embodiment specifies 4 seconds as the duration of the relationship between the skier and the ski lift in the video clip. If the frame rate of the video is 30 frames per second, and the duration of a skier skiing under a ski lift has to be 4 seconds long, the embodiment determines whether the image analysis tool has identified at least 120 contiguous frames in which a skier is below a ski lift.

Of course, multiple subsets of objects in one or more relationships in each other can be specified for analyzing a video clip in this manner. In one embodiment, a duration of a relationship can also be specified as a condition of image analysis to an image analysis tool that has been improved according to an embodiment. The result of the image analysis produces a list of video clips that include the specified set of objects, in the specified relationships, for the specified duration.

In some cases, no single candidate video clip may be able to satisfy the objects-relationship-duration criteria. For example, one video clip might show a skier under a ski lift for 1 second, another video clip might show for 3 seconds a skier at the bottom of a slope and a ski lift passing at the top of the slope. Thus, neither clip satisfies the objects-relationship-duration criteria.

As one example of a secondary analysis, one embodiment specifies that given a subset of objects in a relationship for a given duration, the video analysis should return those video clips in which at least a threshold number of objects are in the specified relationship and for at least a threshold duration. For example, the embodiment may specify that at least one of the ski lift object and a skier object should be in a relationship where the ski lift is above the other object for at least 2 second. Accordingly, a video clip where not a skier object but a ski resort equipment object is situated under a ski lift for at least 2 seconds, would qualify.

As another example of the secondary analysis, another embodiment, specifies that given a subset of objects in a relationship for a given duration, the video analysis should return those video clips in which the subset of objects are present in the specified relationship or a different relationship and for at least a threshold duration. For example, the embodiment may specify that the ski lift object and a skier object should be in a relationship where the ski lift is above the skier object or at least in the same frame for at least 2 second. Accordingly, a video clip where a skier object is situated on a terrace above a ski lift for at least 2 seconds, would qualify.

Thus, an embodiment can find not only video clips with the specified objects in a specified relationship for a specified duration through the primary analysis of the candidate video clips, but also video clips with other combinations as well through secondary analysis of the candidate video clips. For example, the embodiment can also find video clips that have different objects in the specified relationship for the specified duration, video clips that have the specified objects in a different relationship for the specified duration, or other video clips involving other combinations of objects, relationships, and durations.

The embodiment then selects one or more of the video clips with such other combinations to propose a combined video solution. For example, where the script portion involves a skier under a ski lift for 4 seconds, if no fitting video clip is found to satisfy that requirement, the embodiment can propose alternatives, such as using a first video clip that has a 1-second clip of a skier under a ski lift, a second video clip that has a 2-second clip of a resort equipment under a ski lift, and reusing the first video clip that has the 1-second clip of the skier under the ski lift.

Another example manner of fitting a clip to the script portion according to an embodiment can be to change a speed of the clip playback. For example, where the script portion involves a skier under a ski lift for 4 seconds, if no fitting video clip is found to satisfy that requirement, the embodiment can propose alternatives, such as using a video clip that has a 1-second clip of a skier under a ski lift, but that clip is played back during the script portion at one fourth the normal playback speed to cover a 4-second duration.

An embodiment ranks the video clips that are usable for the script portion. For example, when the metadata search returns a set of candidate video clips, the embodiment generates a rank for at least a subset of the candidate video clips. As one non-limiting example of a ranking process, the embodiment ranks that video clip the highest which has the most number of specified objects present therein. Likewise, the embodiment ranks that video clip the lowest which has the least number of specified objects present therein. Other video clips are assigned intermediate ranks based on the number of matching objects they contain.

An embodiment revises the rank of a video clip upon primary analysis and/or secondary analysis. In one non-limiting example process of rank revision, a rank of a video clip is increased to a higher level if the video clip shows the specified objects in the specified relationship. A rank of a video clip is increased to a different higher level if the video clip shows the specified objects in the specified relationship for the specified duration. A rank of a video clip is increased to a different higher level if the video clip shows different objects in the specified relationship for the specified duration. A rank of a video clip is increased to a different higher level if the video clip shows the specified objects in a different relationship. A rank of a video clip is decreased to a lower level if the video clip shows the specified objects but does not show the specified relationship. Further adjustments to a video clip's rank also depend on the duration of the relationship in the video clip.

As a non-limiting example, if a clip shows the relationship of the objects but not for the specified duration, a lower than a threshold rank can be assigned to that clip. The lower than the threshold rank can then be used as an indication that the playback speed of the clip can be adjusted to span the specified duration. For example, a clip whose normal playback time is longer than the specified duration can be played back at a higher than normal speed to compress the clip's playback time to fit the specified duration; and a clip whose normal playback time is shorter than the specified duration can be played back at a slower than normal speed to expand the clip's playback time to fit the specified duration.

These examples of rank adjustments are not intended to be limiting. From this disclosure, those of ordinary skill in the art will be able to conceive many other ways of adjusting a rank of a video clip based on the primary and/or secondary analysis and the same are contemplated within the scope of the illustrative embodiments.

A method of an embodiment described herein, when implemented to execute on a device or data processing system, comprises substantial advancement of the functionality of that device or data processing system in video search. For example, a prior-art method of video search relies upon the metadata associated with the video. The prior-art method cannot determine whether the objects specified in the metadata behave in a specified manner with one another, behave in that manner for a specified time, or both, if the metadata does not specify the behaviors and durations of the behaviors in the associated video clip. An embodiment selects a set of video clips based on the presence of a specified set or a subset of objects in the metadata. An embodiment further analyzes the set of video clips through a primary analysis, a secondary analysis, or both, to detect the behaviors of the objects and the durations of such behaviors in the video clips. An embodiment further selects those video clips from the set of video clips which depicts the objects, behaviors, and durations needed for a script, or which can be combined to satisfy the needs of the script. Such a manner of searching video content to fit a script is unavailable in presently available devices or data processing systems. Thus, a substantial advancement of such devices or data processing systems by executing a method of an embodiment is in improving the fit of a video search result to a needs of a script used in video production.

The illustrative embodiments are described with respect to certain content, metadata, analyses, thresholds, objects, relationships, durations, manners of specifying search parameters, ranks and rankings methods, rank adjustments and considerations for the adjustments, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
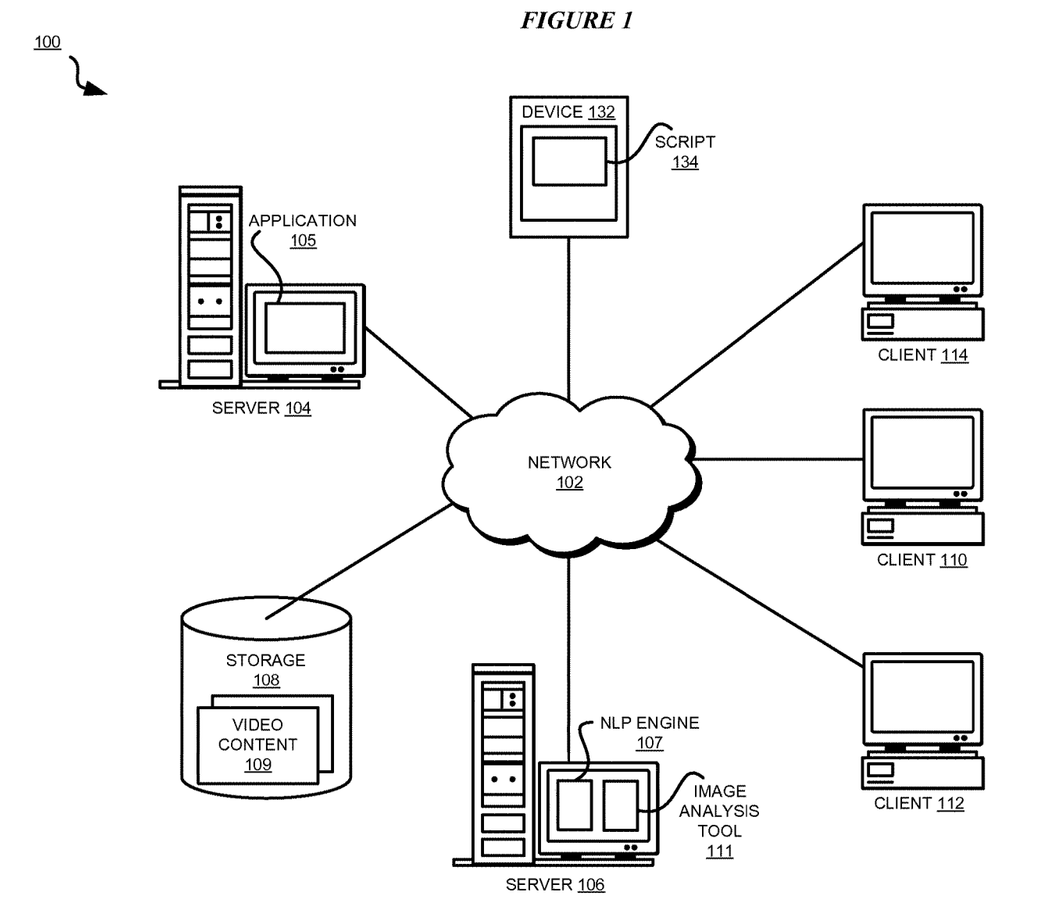
FIG. 1 depicts a block diagram of a network of data processing systems in which illustrative embodiments may be implemented.
Figure 2:
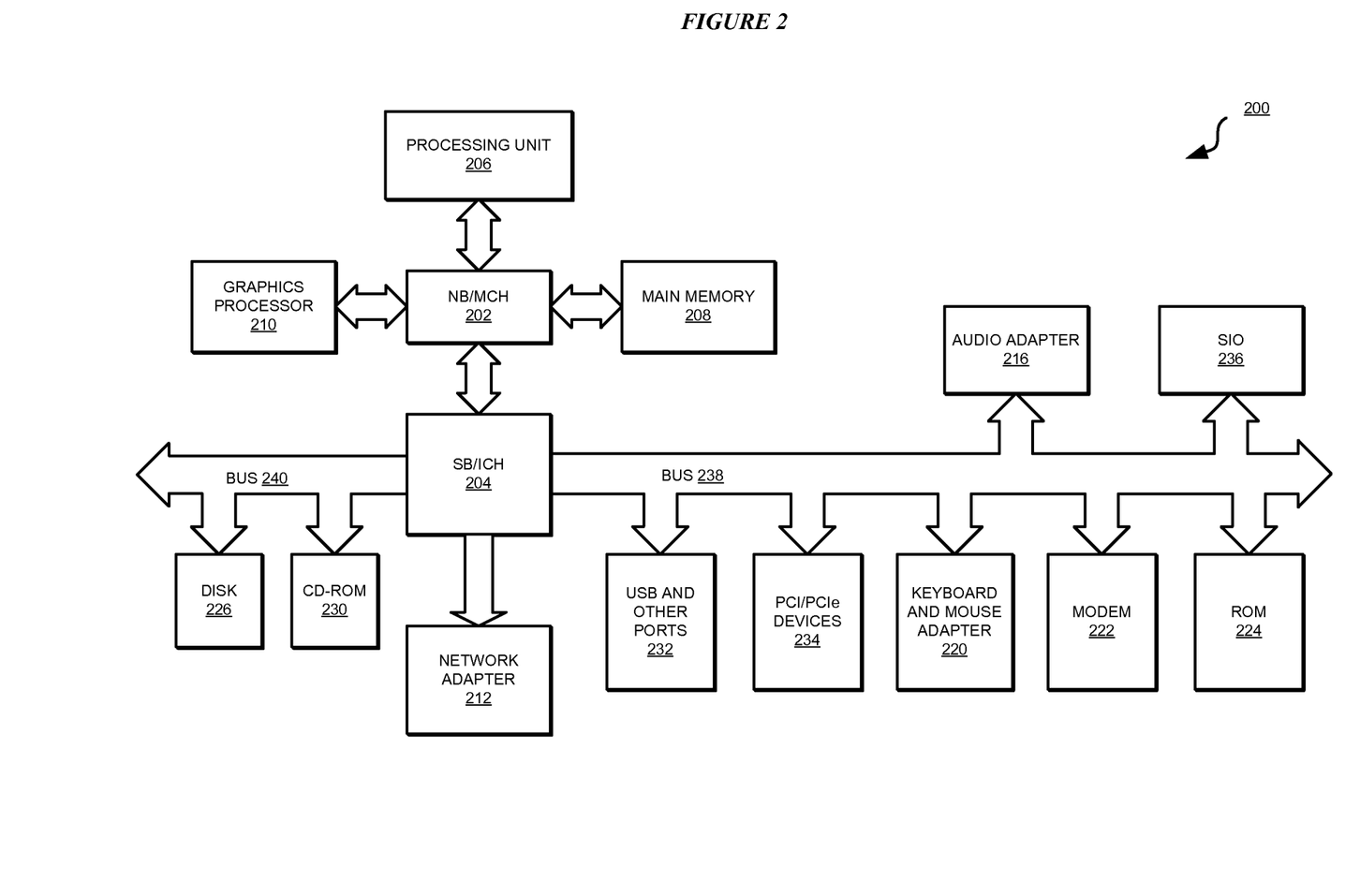
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. For example, application 105 uses NLP engine 107 to deep parse a portion of script 134 and construct an ORD. Application 105 uses the ORD with a metadata-based video search tool (not shown) to select some video content 109 from repository 108. Application 105 uses image analysis tool 111 with the selected video content to identify those video clips which satisfy an object-relationship-duration need of the portion of script 134.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG.

2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
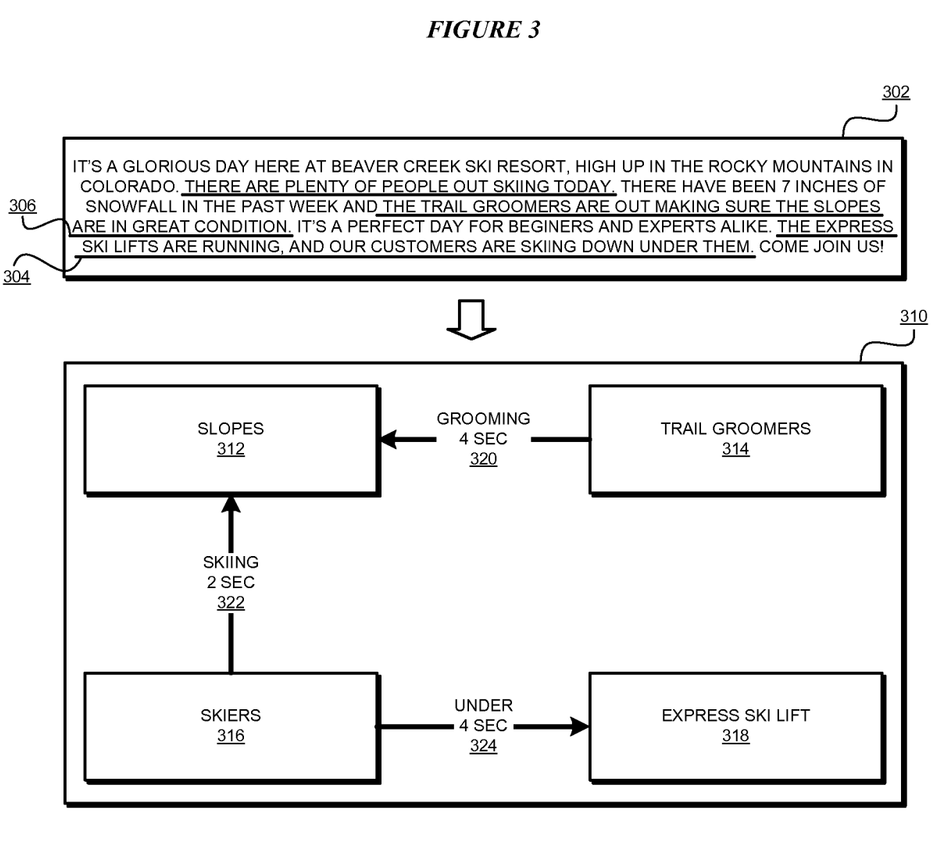
FIG. 3 depicts an example ORD in accordance with an illustrative embodiment.

With reference to FIG. 3, this figure depicts an example ORD in accordance with an illustrative embodiment. Script 302 is an example of script 134 in FIG. 1. Application 105 in FIG. 1 constructs ORD 310 from script 302 as described herein.

Portions 304 and 306 are example portions of script, which are marked in any suitable manner. As depicted in a mom-limiting manner, portions 304 and 306 are marked with underlines. Application 105 has to find video clips that fit the script content of portions 304 and 306.

Consider portion 304 as an example. The portion states, "the express ski lifts are running, and our customers are skiing down under them." Some of the objects in portion 304 are "express ski lifts", "customers", and "them". As described herein, by using an NLP engine, application 105 resolves "customers" to "people skiing", which resolves to "skiers" object. Similarly, the application resolves "them" to "express ski lifts" object. Optionally, application 105 can also generalize "express ski lifts" object to "ski lifts" object using the NLP engine.

Similarly, portion 306 and other portions of script 302 yield object "slopes"—which can be generalized to object "ski run" or other similarly purposed substitute object. The application extracts object "trail groomers" from script 302 in a similar manner.

Object "slopes" is represented as object 312 in ORD 310. Similarly, objects "trail groomers", "skiers", and "express ski lift" are represented as objects 314, 316, and 318, respectively, in ORD 310.

The application further uses the NLP engine to determine a relationship between the various extracted objects 312-318. From the context provided by script 302, and the usage of objects 312-318 therein, the application determines that "trail groomers" object 314 is related to "slopes" object 312 via "grooming" relationship 320. Similarly, the application determines that "skiers" object 316 is related to "slopes" object 312 via "skiing" relationship 322. The application also determines that "skiers" object 316 is related to "express ski lifts" object 318 via "under" relationship 324.

Furthermore, using one or more duration calculation methods described herein, the application determines a length of time of coverage, e.g., of a narration, of a particular relationship. For example, the application computes that in script 302, "grooming" relationship 320 spans, or is covered for, 4 seconds; "skiing" relationship 322 is covered for 2 second, and "under" relationship 324 is covered for 4 seconds. Thus, the application constructs ORD 310 with set of objects 312-318 and set of relationships 320-324 with their corresponding durations.

Figure 4:
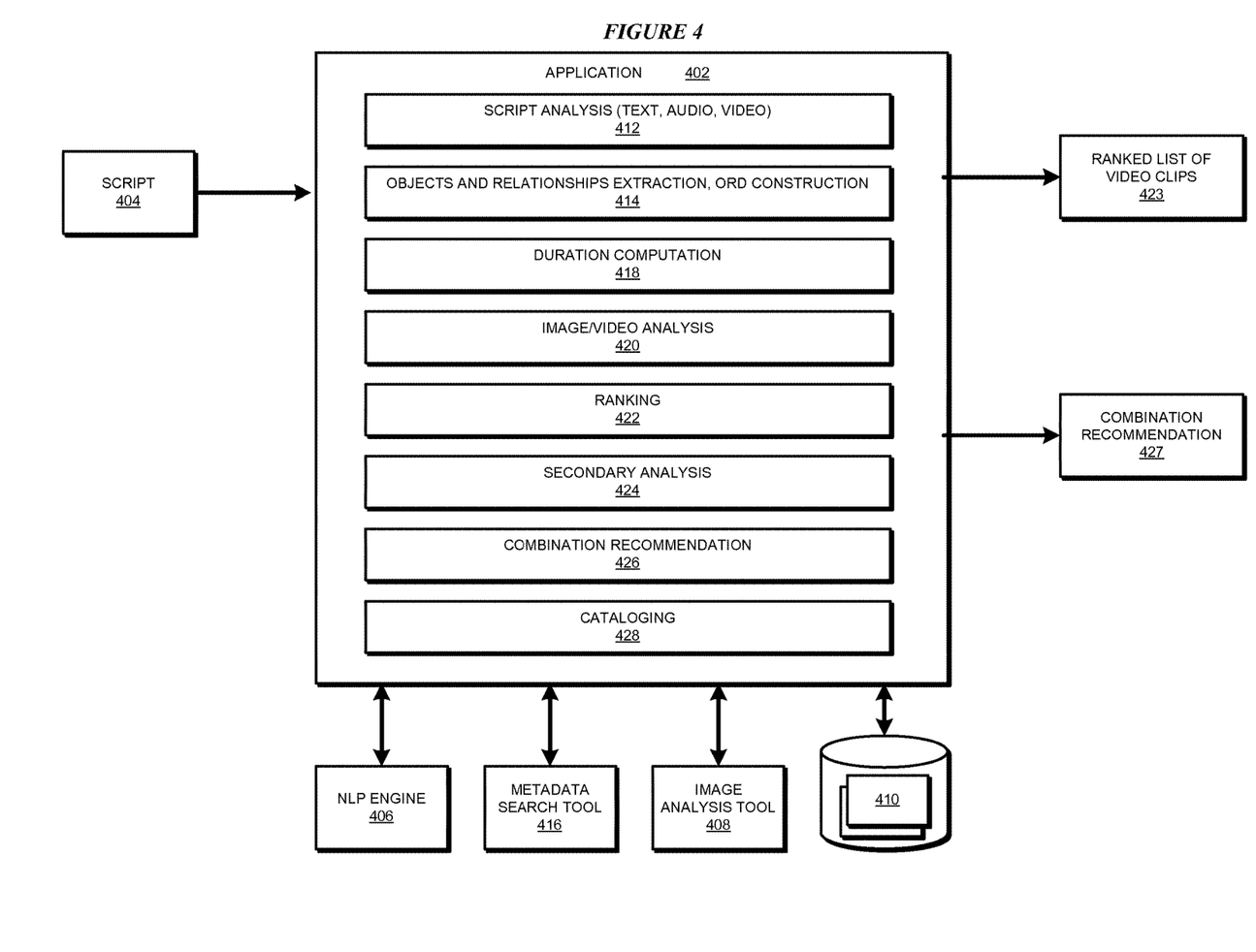
FIG. 4 depicts a block diagram of a configuration for searching video content to fit a script in accordance with an illustrative embodiment.

With reference to FIG. 4, this figure depicts a block diagram of a configuration for searching video content to fit a script in accordance with an illustrative embodiment. Application 402 is an example of application 105 in FIG. 1. Script 404 is an example of script 134 in FIG. 1. NLP engine 406 is an example of NLP engine 107 in FIG. 1. Image analysis tool 408 is an example of image analysis tool 111 in FIG. 1. Video clips 410 are examples of video content 109 in FIG. 1.

Component 412 receives script 404. Component 412 determines a type of content of the script, such as whether the script is textual, audio data, or video data, or some combination thereof. Depending upon the type of data of script 404, component 412 identifies a marked portion of script 404, such as portion 304 in FIG. 3, for which video content has to be found or compiled.

Component 414 extracts a set of objects and a corresponding set of relationships from the portion. Using the extracted objects and their relationships, component 414 constructs an ORD, such as ORD 310 in FIG. 3. Component 414 sends the extracted set of objects to metadata search tool 416. Metadata search tool 416 searches the repository of video clips 410 to find video clips that specify at least a threshold number of objects from the set of objects. Metadata search tool 416 returns to component 414 a selected set of video clips 410.

Component 418 computes a duration of a relationship in the portion, such as a duration of relationship 324 in portion 304 of FIG. 3. Component 420 provides to image analysis tool 408 the relationship, the objects involved in the relationship, and the duration of the relationship. Tool 408 analyzes each video clip in the selected set of video clips to find some combination of the objects, the relationship and the duration as described in this disclosure. Tool 48 returns a subset of the selected set of video clips that satisfy the objects-relationship-duration criteria for the analysis.

Component 422 ranks the video clips in the subset returned from tool 408 in a manner described herein. Component 422 produces ranked list 423 of video clips from the subset. In one adaptation of an embodiment, ranked list 423 may list only the top n ranked video clips from the subset.

When requested by a user, or when application 402 is configured to make a recommendation to combine video clips to achieve an objective of a portion of script 404, component 422 performs a secondary analysis as described earlier. Component 426 computes a combination that can fit the objects-relationship-duration criteria of the portion to some degree.

Component 426 produces combination recommendation 427. Various combinations in recommendation 427 may fit the criteria to various degrees. Accordingly, the various combinations may have various rank values as well. In one adaptation of an embodiment, ranked recommendation 427 may list only the top m ranked combinations from the subset.

Application 402 is also usable for cataloging a video clip repository with improved information about the video clips contained therein. For example, operating independently of script 404, component 428 uses image analysis tool 408 to identify the objects and relationships in a given instance of video clip 410. Component 428 computes a duration of a relationship in the given instance of video clip 410. Component 428 stores the found objects, relationships, and durations in the instance of video clip 410 as an improved metadata of the instance of video clip 410.

Optionally, component 428 can also use NLP engine 406 to determine a linguistically broader set of objects and relationships that can be represented by the objects found in the instance of video clip 410. For example, if a ski slope object is found in the instance of video clip 410, component 428 can add additional objects such as slope, ski trail, trail, and mountain, as other objects that the instance can possibly represent or support. These other words are linguistic and/or grammatical equivalents of the exact object that is found in the instance. Similarly if the instance contains a "skiing under" relationship with another object, component 428 can add additional relationships, such as "skiing", "below", "athletic activity", "mountain sports", and the like to increase the usability of the instance of video clip 410.

Figure 5A:
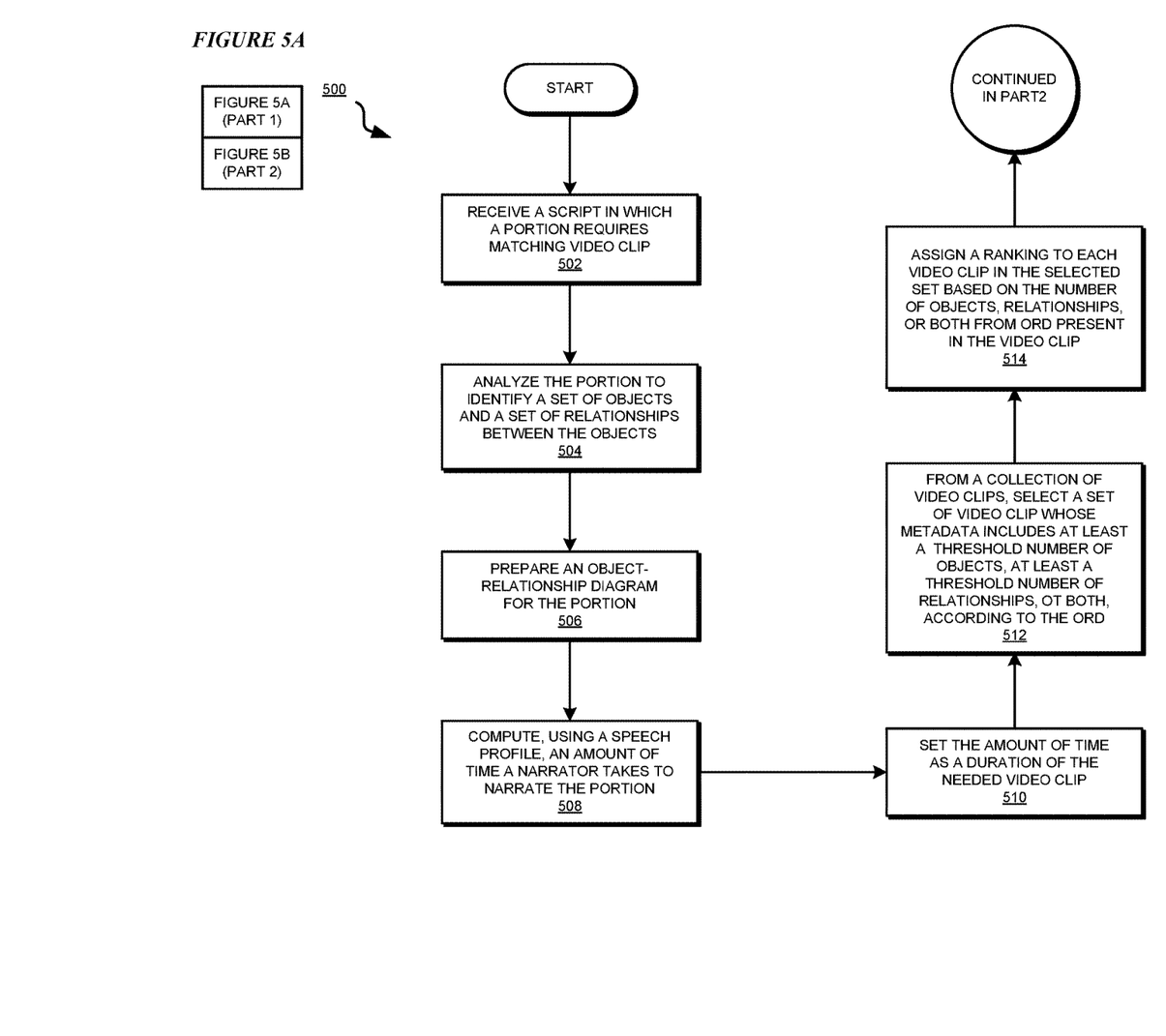
FIGS. 5A depicts a first part and FIG. 5B depicts a second part of a flowchart of an example process for searching video content to fit a script in accordance with an illustrative embodiment.
Figure 5B:
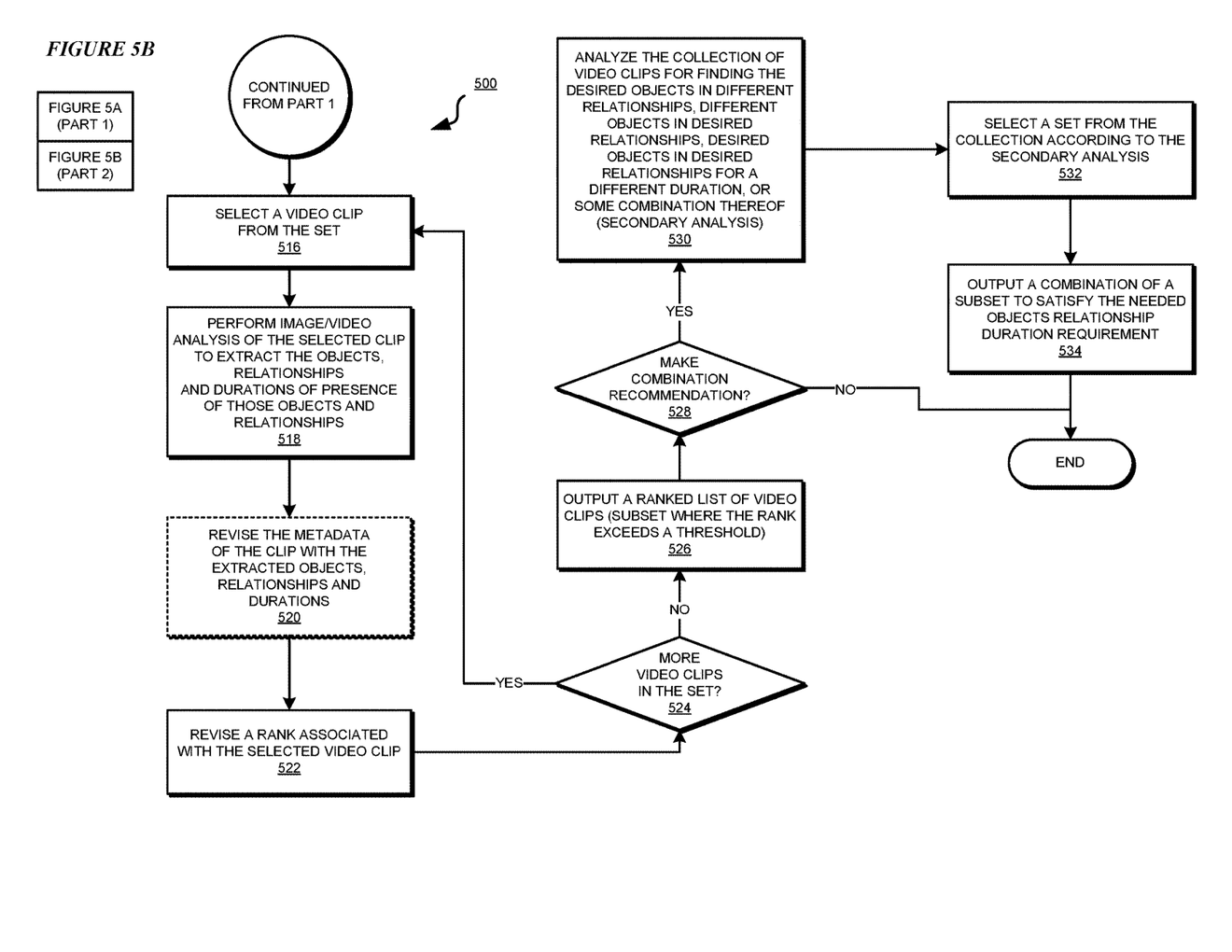

With reference to FIG. 5, this figure depicts a flowchart of an example process for searching video content to fit a script in accordance with an illustrative embodiment. Process 500 can be implemented in application 402 in FIG. 4. Process 500 has been split into part 1 and part 2 for the clarity of the depiction.

Starting in part 1, the application receives a script in which a portion has been marked as requiring a matching video clip (block 502). The application analyzes the script, the portion, supporting data of the script, or some combination thereof, to identify a set of objects and a set of relationships between the objects present in the portion (block 504).

The application prepares an ORD for script, or just the portion, as may be suitable for a given script (block 506). The application computes a duration for which the relationship applies in the portion (block 508). For example, according to one embodiment, the application uses a speech profile of a narrator who narrates the portion to determine the duration in a manner described herein.

The application sets the duration as the duration of the needed video clip (block 510). From a collection of video clips, the application selects a set of video clips whose metadata includes at least a threshold number of the objects from the set of objects, at least a threshold number of relationships from the set of relationships, or both (block 512). Note that some video clips may have some metadata describing at least some relationships that are present in the video clip. For example, the metadata of an example video clip may specify not only a man (object) and a horse (object) that are portrayed in a riding video, but also a "riding" (relationship). In such cases, the relationships can also be supplied to the metadata search to utilize such metadata.

The application assigns a ranking to each video clip in the selected set of video clips based on the number of objects from the set of objects, the number of relationships from the set of relationships, or both, that are present in each video clip (block 514). Some example methods of ranking are provided elsewhere in this disclosure.

Continuing into part 2 of FIG. 5, the application selects a video clip from the set of video clips (block 516). The application analyzes the video content of the selected video clip to extract the objects, relationships, and durations present in the video clip (block 518). Optionally, as described with respect to the cataloging function of application 402 in FIG. 4, the application revised or modifies the metadata of the selected video clip to include the objects, relationships, and durations extracted from the analysis of the video clip (block 520).

The application adjust a ranking of the selected video clip according to how, and to what extent, the selected video clip fits the objects-relationship-duration requirement of the portion of the script (block 522). The application determines whether more video clips are in the set selected at block 512 (block 524). If more video clips remain to be analyzed in the selected set ("Yes" path of block 524), the application returns process 500 to block 516. If no more video clips remain in the set to be analyzed ("No" path of block 524), the application outputs a ranked list of video clips (block 526). In some cases, the ranked list may only include a specified number of top ranked video clips or only those video clips whose ranks exceed a threshold rank.

The application determines whether a combination recommendation has been requested or should be made (block 528). If no combination recommendation is needed ("No" path of block 528), the application ends process 500 thereafter. If a combination recommendation is needed ("Yes" path of block 528), the application analyzes the collection of video clips for finding the [desired objects, desired relationship, desired duration] criteria, or a criteria with [desired objects, desired relationship, different duration] or a criteria with [different objects, desired relationship, desired or different duration], or a criteria with [desired objects, different relationship, desired or different duration], or some combination thereof (block 530).

The application selects a set of video clips from the collection of video clips according to the analysis of block 530 (block 532). The application constructs a combination that fits the [desired objects, desired relationship, desired duration] criteria of the portion of the script to some degree and with some variation. The application outputs the combination (block 534). The application ends process 500 thereafter.

Thus, a computer implemented method, system or apparatus, and computer program product are provided in the illustrative embodiments for searching video content to fit a script. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for video searching, the method comprising:
   determining, in a portion of a script for creating a video, a set of objects and a relationship between objects in the set of objects;
   selecting, from a collection of video clips, a set of video clips, the selecting being based on matching an object from the set of objects to an object specified in a metadata of a video clip that is selected in the set of video clips;
   computing a duration of presence of the relationship between objects in the portion;
   performing video analysis on the video clip to determine whether the video clip includes the relationship;
   determining, responsive to the video clip including the relationship, whether the relationship in the video clip is at least of the duration; and
   selecting, responsive to the relationship being at least of the duration, the video clip as a fit for the portion of the script.

2. The method of claim 1, further comprising:
   determining an amount of time a narrator takes to narrate the portion; and
   using the amount of time as the duration of the relationship.

3. The method of claim 2, further comprising:
   using a speech profile of the narrator to determine a speed of narration of the narrator, the speed being related to a subject matter of the portion.

4. The method of claim 1, further comprising:
   determining that the relationship in the video clip is shorter than the duration; and
   recommending the video clip in a combination with a second video clip to fit the portion of the script.

5. The method of claim 1, further comprising:
   computing, as a part of performing the video analysis, a duration of the relationship in the video clip.

6. The method of claim 1, further comprising:
   determining that the relationship in the video clip matches the relationship in the portion but the relationship in the video clip includes a different object, wherein the different object is not a member of the set of objects; and
   recommending the video clip in a combination with a second video clip to fit the portion of the script.

7. The method of claim 1, further comprising:
   determining that the relationship in the video clip does not match the relationship in the portion but the relationship in the video clip uses objects from the set of objects; and
   recommending the video clip in a combination with a second video clip to fit the portion of the script.

8. The method of claim 1, further comprising:
   increasing, responsive to determining that the relationship in the video clip matches the relationship in the portion, a rank associated with of the video clip.

9. The method of claim 1, further comprising:
   specifying that at least a threshold number of objects from the set of objects has to match corresponding objects specified in the metadata of the video clip.

10. The method of claim 9, further comprising:
    assigning a rank to the video clip according to a number of objects matching between the set of objects and the metadata.

11. The method of claim 1, further comprising:
    receiving the script; and
    identifying, using a marking in the script, the portion, wherein the marking indicates that a stock video clip has to be fitted to the portion.

12. The method of claim 1, further comprising:
    determining that the script and the portion are received as audio data; and
    transcripting the audio data into textual data.

13. The method of claim 1, wherein the method is embodied in a computer program product comprising one or more computer-readable storage devices and computer-readable program instructions which are stored on the one or more computer-readable tangible storage devices and executed by one or more processors.

14. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

15. A computer program product for video searching, the computer program product comprising one or more computer-readable storage devices, and program instructions stored on at least one of the one or more storage devices, the stored program instructions comprising:
    program instructions to determine, in a portion of a script for creating a video, a set of objects and a relationship between objects in the set of objects;
    program instructions to select, from a collection of video clips, a set of video clips, the selecting being based on matching an object from the set of objects to an object specified in a metadata of a video clip that is selected in the set of video clips;
    program instructions to compute a duration of presence of the relationship between objects in the portion;
    program instructions to perform video analysis on the video clip to determine whether the video clip includes the relationship;
    program instructions to determine, responsive to the video clip including the relationship, whether the relationship in the video clip is at least of the duration; and
    program instructions to select, responsive to the relationship being at least of the duration, the video clip as a fit for the portion of the script.

16. The computer program product of claim 15, further comprising:
    program instructions to determine an amount of time a narrator takes to narrate the portion; and
    program instructions to use the amount of time as the duration of the relationship.

17. The computer program product of claim 16, further comprising:
    program instructions to use a speech profile of the narrator to determine a speed of narration of the narrator, the speed being related to a subject matter of the portion.

18. The computer program product of claim 15, further comprising:
    program instructions to determine that the relationship in the video clip is shorter than the duration; and program instructions to recommend the video clip in a combination with a second video clip to fit the portion of the script.

19. The computer program product of claim 15, further comprising:

program instructions to compute, as a part of performing the video analysis, a duration of the relationship in the video clip.

20. A computer system for video searching, the computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to determine, in a portion of a script for creating a video, a set of objects and a relationship between objects in the set of objects;

program instructions to select, from a collection of video clips, a set of video clips, the selecting being based on matching an object from the set of objects to an object specified in a metadata of a video clip that is selected in the set of video clips;

program instructions to compute a duration of presence of the relationship between objects in the portion;

program instructions to perform video analysis on the video clip to determine whether the video clip includes the relationship;

program instructions to determine, responsive to the video clip including the relationship, whether the relationship in the video clip is at least of the duration; and program instructions to select, responsive to the relationship being at least of the duration, the video clip as a fit for the portion of the script.

* * * * *